United States Patent
Kaplan et al.

(10) Patent No.: US 9,996,685 B2
(45) Date of Patent: Jun. 12, 2018

(54) KEYBOARD NEUTRAL AUTHENTICATION

(71) Applicant: International Business Machines Corporation, Armonk, NY (US)

(72) Inventors: Philippe Kaplan, Le Rouret (FR); Georges-Henri Moll, Villeneuve-Loubet (FR); Xavier Arnaud Bernard Nodet, Antibes (FR); Olivier Oudot, Vallauris (FR)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 14/861,145

(22) Filed: Sep. 22, 2015

(65) Prior Publication Data

US 2016/0117494 A1    Apr. 28, 2016

(30) Foreign Application Priority Data

Oct. 24, 2014   (GB) .................... 1418934.4

(51) Int. Cl.
*G06F 21/36* (2013.01)
*G06F 21/46* (2013.01)
*G06F 21/31* (2013.01)

(52) U.S. Cl.
CPC .............. *G06F 21/36* (2013.01); *G06F 21/31* (2013.01); *G06F 21/46* (2013.01)

(58) Field of Classification Search
CPC .......... G06F 21/36; G06F 21/31; G06F 21/46; G06F 3/0233; G06F 3/0238; G06F 3/018; G06F 3/0488; G06F 1/1662
See application file for complete search history.

(56) References Cited

U.S. PATENT DOCUMENTS

| | | | | |
|---|---|---|---|---|
| 4,404,547 A | * | 9/1983 | Zybailo | H01H 13/70 200/11 TW |
| 5,491,752 A | * | 2/1996 | Kaufman | G06F 21/335 380/30 |
| 7,484,173 B2 | | 1/2009 | Gao et al. | |
| 7,921,454 B2 | | 4/2011 | Cerruti et al. | |
| 8,520,848 B1 | | 8/2013 | Liu et al. | |
| 2003/0140258 A1 | * | 7/2003 | Nelson | G06F 21/46 726/6 |
| 2004/0178881 A1 | | 9/2004 | Otsubo et al. | |
| 2008/0165035 A1 | | 7/2008 | Bhella et al. | |
| 2008/0177920 A1 | | 7/2008 | Dennis | |

(Continued)

OTHER PUBLICATIONS

"Mac OS X Server 1 .x: Password not Working After Keyboard Layout Change", http://support.apple.com/kb/TA43868?locale=en_US&viewlocale=en_US, Feb. 18, 2012, 2 Pages.
International Search Report, dated Apr. 29, 2015, 3 Pages.

*Primary Examiner* — Catherine B Thiaw
(74) *Attorney, Agent, or Firm* — Daniel Simek; Hoffman Warnick LLC

(57) ABSTRACT

A method of performing user authentication including the steps of receiving a password comprising a sequence of characters, accessing one or more alternative keyboard layout definitions, generating one or more additional passwords from applying the alternative keyboard layout definitions to the sequence of characters, and using the received password and the additional passwords in the user authentication process.

11 Claims, 5 Drawing Sheets

(56) References Cited

U.S. PATENT DOCUMENTS

| | | |
|---|---|---|
| 2008/0291060 A1 | 11/2008 | Wormald |
| 2009/0044282 A1 | 2/2009 | Govindaraju |
| 2009/0106827 A1* | 4/2009 | Cerruti .................... G06F 21/31 726/7 |
| 2009/0259840 A1* | 10/2009 | Campbell ........ G07B 17/00733 713/155 |
| 2010/0180338 A1* | 7/2010 | Stewart ................... G06F 21/31 726/19 |
| 2010/0182242 A1* | 7/2010 | Fields ..................... G06F 3/016 345/169 |
| 2010/0275257 A1 | 10/2010 | Nishida |
| 2014/0165169 A1* | 6/2014 | Buck ....................... G06F 21/31 726/7 |
| 2014/0372754 A1* | 12/2014 | Aissi ...................... H04L 63/08 713/168 |
| 2014/0373115 A1* | 12/2014 | Hartman ................ G06F 21/31 726/6 |

* cited by examiner

KEYBOARD NEUTRAL AUTHENTICATION

FIELD OF THE INVENTION

This invention relates to a method of, and system for, performing user authentication.

BACKGROUND

When using electronic computing devices such as desktop computers, laptops, smartphones and so on, it is common for there to be some form of user authentication used. This user authentication can be to protect the device itself, so that it cannot be used unless the correct password is entered, and can also be used to identify a user who is attempting to access a specific service, such as online banking, with the relevant device. User authentication methods will almost always use, as a minimum, a password, often combined with a login name and also other techniques such as using smartcards and biometric data.

A common problem faced by users when signing in is that as a user types a password, they do not see the characters on screen, as they are normally obscured in order to prevent any third party identifying the characters that have been typed on a keyboard. Users tend to remember the gestures for their password, rather than the symbols that compose it. Indeed, sometimes the password is a gesture. It is also the case that users tend to become very familiar with the keyboard layout that they use, while not appreciating that other keyboard layouts exist that have subtle differences between the layouts. If the user does not appreciate that the current keyboard layout is the same as their normal one, then errors can occur.

If it is considered that a declared keyboard is the current keyboard defined in the computer through operating system configuration then it can be assumed that the client software knows the declared keyboard. The real keyboard is the keyboard that is plugged into the computer. Situations where the real keyboard is different from declared keyboard and the client has no way of knowing this include the input of a BIOS password when the BIOS settings do not match the real keyboard, a remote desktop login, a keyboard remapped on a client and a bad application configuration or user error. All of these situations can lead to confusion as to the keyboard configuration that the user believes they are using and the keyboard configuration that the relevant software is aware of.

The user may type the wrong password and as a result, an authentication process can fail. For example, a user may type the password "carthago", assuming that they are using an azerty keyboard and this will be rendered as "cqrthqgo" if in fact the current keyboard is a qwerty keyboard, resulting in a password mismatch. If the user tries again, then this slows down the login session and leads to user frustration, especially if the user is not aware of the keyboard mismatch and the user's password can get revoked.

BRIEF SUMMARY OF THE INVENTION

According to a first aspect of the present invention, there is provided a method of performing user authentication, the method comprising the steps of receiving a password comprising a sequence of characters, accessing one or more alternative keyboard layout definitions, generating one or more additional passwords from applying the alternative keyboard layout definitions to the sequence of characters, and using the received password and the additional passwords in the user authentication process.

According to a second aspect of the present invention, there is provided a system for performing user authentication, the system comprising a processor arranged to receive a password comprising a sequence of characters, access one or more alternative keyboard layout definitions, generate one or more additional passwords from applying the alternative keyboard layout definitions to the sequence of characters, and use the received password and the additional passwords in the user authentication process.

According to a third aspect of the present invention, there is provided a computer program product on a computer readable medium for performing user authentication, the product comprising instructions for receiving a password comprising a sequence of characters, accessing one or more alternative keyboard layout definitions, generating one or more additional passwords from applying the alternative keyboard layout definitions to the sequence of characters, and using the received password and the additional passwords in the user authentication process.

Owing to the invention, it is possible to provide a user authentication process that will not fail should the user have a mismatch between the keyboard that they think they are using with the keyboard that they are actually using. If the user makes a mistake or the computer's software representation of the keyboard is different from the physical keyboard in front of the user, then this will be corrected for in the improved authentication method.

Since the number of widely used keyboards is quite small, it is possible to store one or more representations of these alternative keyboards and these can be used to generate alternative passwords from the actual password generated in response to the user input of their password. The received password and the additional passwords will all be processed as alternates and as long as one of these passwords works in the user authentication process, then the user will be authenticated even if the actual password that they typed does not match their original password, as long as one of the additional passwords does match.

The improved process focuses on a sign-in session where the declared keyboard is not equal to the real keyboard, not on a password set/change session. The process provides a modification of the authentication protocol that supports different keyboard layouts, without user intervention. The user can configure the client with a set of potential keyboards, which is optional, as the client can have a default set built-in. Preferably, at sign-in time, the user password is mapped (then hashed) to the n different keyboards and the client sends the n hashed passwords (in a single network packet). The server tests the client passwords against the expected one. If there is a match, the login is ok else login is denied. The main advantage is that the user can type their password as a gesture or using the real keyboard layout and the correct password will always be generated and sent.

Preferably, the alternative keyboard layout definition comprises a three-dimensional matrix of different keyboard layouts mapping characters on each keyboard layout to characters on the other keyboard layouts. The alternative keyboard layouts can be logically considered as a stack of keyboards on top of each other, with the current default keyboard on top. A press on the specific key on the top keyboard logically can be considered as a press on all of the other keys below at the same point on each keyboard. This can be represented as a three-dimensional matrix with each x,y layer of the matrix defining a single two-dimensional representation of a keyboard layout. The z dimension is number of different keyboard layouts present within the matrix. This provides a simple way of gathering together the information about the different keyboard layouts and provides an easy way of actually generating the alternative characters. A password typed on the top keyboard layout, i.e. the real keyboard for the user, will generate additional passwords according to the number of z layers in the matrix. Each of these passwords can then be handled together in the authentication (whether they are then hashed or processed in other ways as per the specifics of the authentication process being used).

BRIEF DESCRIPTION OF THE DRAWINGS

Preferred embodiments of the present invention will now be described, by way of example only, with reference to the following drawings, in which.

DETAILED DESCRIPTION OF THE DRAWINGS

Figure 1:
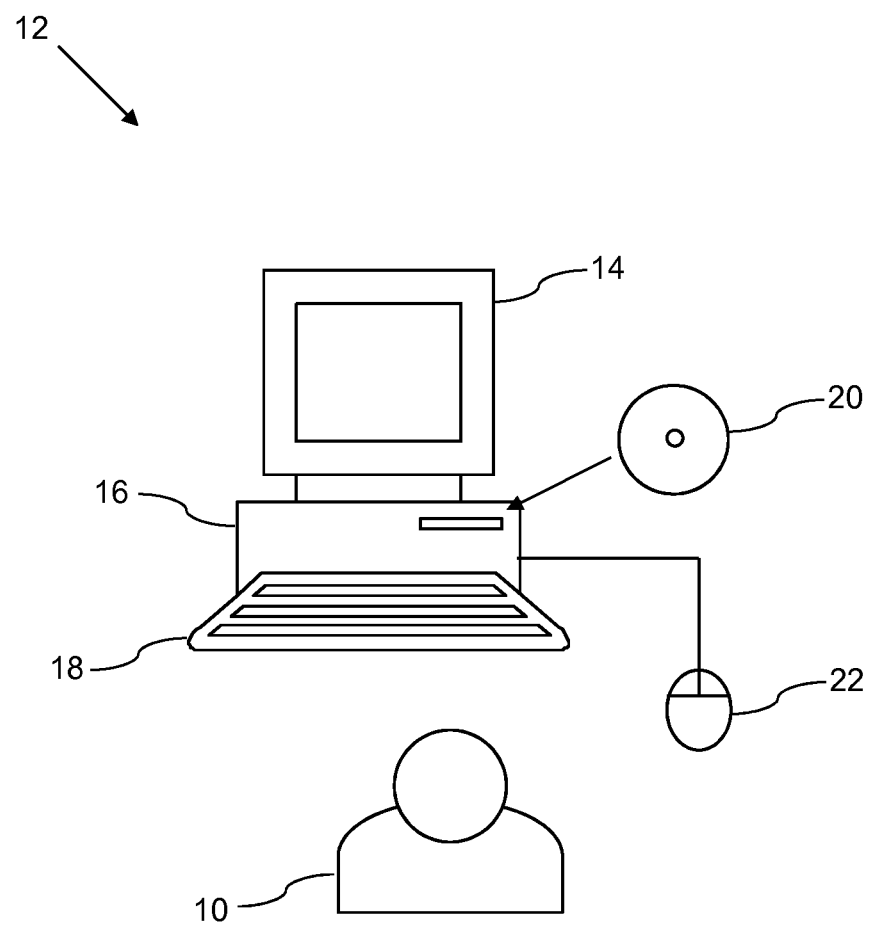
FIG. 1 is a schematic diagram of computer system.

FIG. 1 shows a user 10 using a desktop computer system 12 to login to a user session. The computer system 12 comprises a display device 14, a processor 16 and a user input device (a conventional keyboard) 18. The processor 16 is connected to the display device 14 and the user input device 18. The processor 16 is running an operating system with which the user 10 can interact via a graphical user interface of the operating system, which is being displayed by the display device 14. A CD-ROM 20 is shown, which can be used to store a copy of a computer program product which is being executed by the processor 16.

An additional user interface device 22 is also shown, which is a conventional mouse 22. The user 10 utilises the keyboard 18 and mouse 22 to interact with the operating system and applications being run by the processor 16, which is displaying the login screen that the user 10 is looking at on the display device 14. In order to use the machine 12, the user must perform a login to initiate a user session. In its simplest form, this login will comprise an on-screen request for a username and a password, which the user enters via the keyboard 18. When the user enters their password, this will be obscured on the display device 14.

In the context of the authentication process, a client is the application where the user logs in (such as a browser or session manager etc.), a server is the application providing the access through an authentication method, the declared keyboard is the current keyboard defined by the computer (through operating system configuration) and it is assumed that the client knows the declared keyboard and the real keyboard is the keyboard plugged into the computer. As described above there will be situations where the user 10 is confused about the keyboard configuration or there is a mismatch between the hardware keyboard 18 and the computer's software configuration of the keyboard 18.

Different keyboard layouts are well-known, common layouts include the US "qwerty" keyboard, the French "azerty" keyboard and the UK Dvorak keyboard. More information on the topic of different keyboard layouts can be found at http://en.wikipedia.org/wiki/Keyboard_layout, for example. The improved process of handling keyboard layout mismatch focuses on the user sign-in session, where it is assumed that the declared keyboard is not the same as the real keyboard, not on password set/change session. The authentication protocol is modified so that it supports different keyboard layouts, without user intervention. The authentication method is adapted to take into account any keyboard layout mismatch.

The user configures the client on their machine with a set of potential keyboards or optionally, the client can have a default set built-in. At sign-in time, the user password is mapped, and then hashed to the n different keyboards. The client sends the n hashed passwords in a single network packet to the server and the server tests the client passwords against the expected one. If a match is made, the login is ok, otherwise the login is denied. The main advantage is that the user can type their password as a gesture or using the real keyboard layout, and the correct password will always be generated and sent.

In effect, the authentication process determines additional passwords from the user's entered password, where each additional password corresponds to the same key presses on the different keyboard layouts. One password will be generated for each keyboard layout that the client knows about. In this way if there is any mismatch between the actual keyboard configuration being used by the operating system and the user's understanding of the keyboard layout, this will be corrected in the authentication process. If the user thinks they are using the French "azerty" but the operating system has the keyboard layout configured as the US/UK "qwerty" layout, then a press of the "q" key (which the user thinks is actually an "a") will be corrected by the process.

Figure 2:
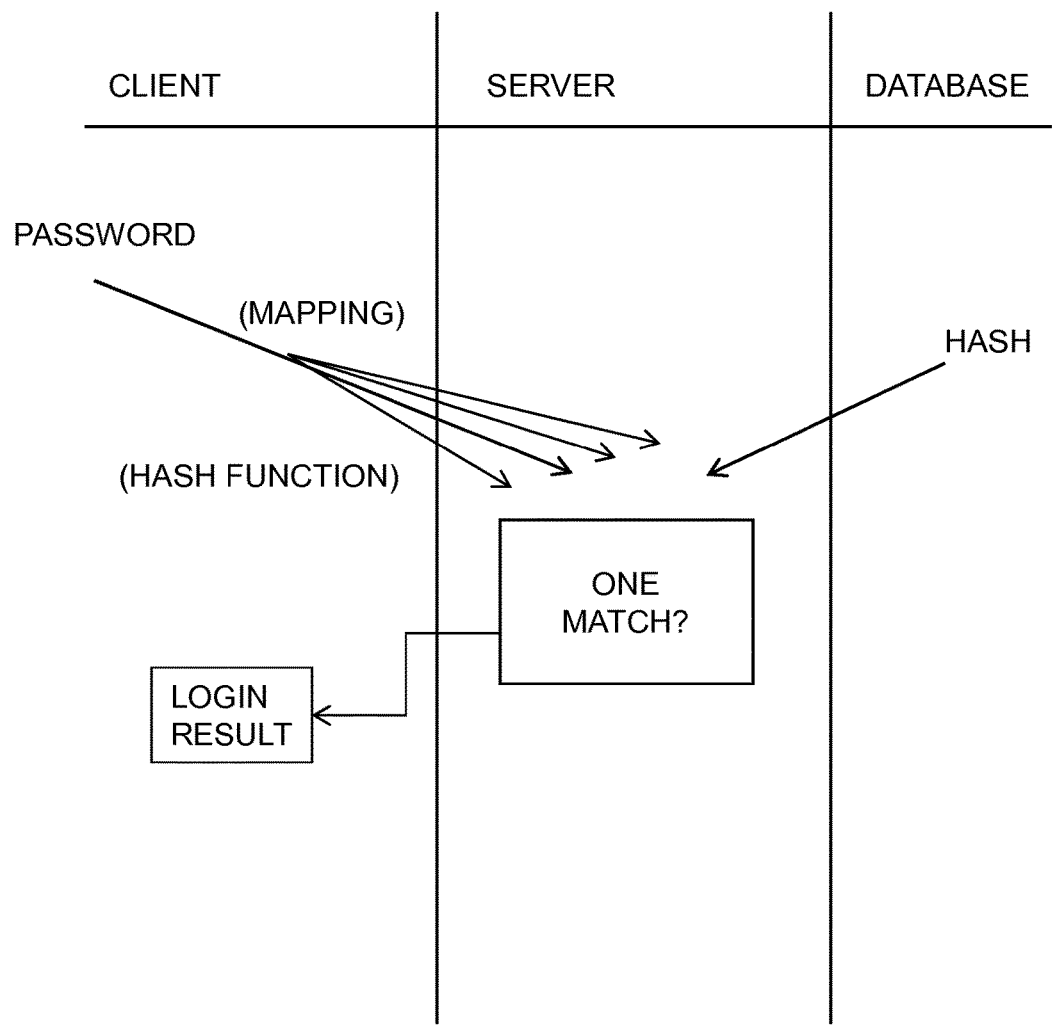
FIG. 2 is a schematic diagram of a user authentication workflow.

FIG. 2 illustrates a user authentication workflow, from the point of view of three different components, a client, a server and a database. Each component in the system can be considered as a software and hardware combination communicating with each other component over some suitable network architecture. The user interacts with the client that is stored on their local machine 12 and the client communicates with a remote server that is running the authentication protocol. The server is also in contact with a database, which stores information relevant to the users that will be authorised by the server. Such a setup could be for an online banking web service, for example.

The authentication system is configured to use a hashing function, for additional security. This means that when a user enters their password at the client, then the password is hashed using a hashing function and only the hash is communicated over the network and stored by the database. Since the original password cannot be reconstructed from the hash (assuming that a sufficiently sophisticated hash function is used) this means that any intercept of the hash or unauthorised access to the hash stored by the database does not threaten the security of the actual password. Although communications between components will be encrypted, the use of the hashing function increases the security of the system.

In this Figure, it will be seen that the original password entered by the user will be mapped to multiple additional passwords using the various different keyboard layouts that are known to the client. Each of these additional passwords is also hashed along with the original entered password to produce multiple hash values all of which are packeted together and sent to the server. The single hash stored by the database is then compared to each of these multiple hash values and as long as one of the hash values matches the hash value stored by the database, then the authentication process has succeeded and the user is logged in to the specific service.

Figure 3:
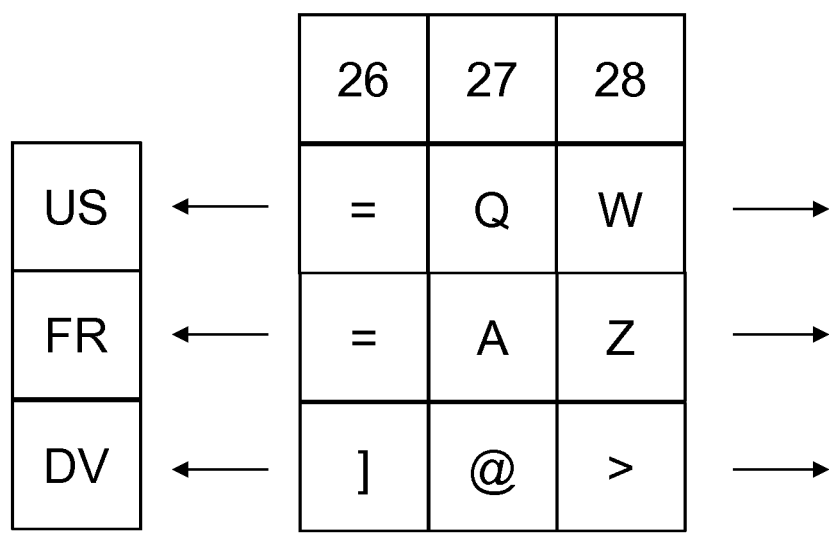
FIG. 3 is a table of keyboard layouts.

The process of generating the additional passwords can be carried out in a number of different ways. One method is to use a static analysis to define a table of characters generated by the same keystroke, for all keyboard layouts that are known to the client. Each line in the table is a different keyboard layout, for example line 1 is US, line 2 is French, line 3 is UK-Dvorak and so on, as shown in FIG. 3. Each column is a keystroke number, which represents the character that is generated for different keyboards when the user presses the specific key. Each row is a keyboard layout and this yields a mapping character to number and number to character for each keyboard layout.

For example column 27 gives the results US('Q')=Fr ('A')=Dv('@')=27, which can be expressed as: US(27)='Q'; Fn(27)='A'; Dv(27)='@'. In the table, a portion of which is shown in FIG. 3, the specific column 27 gives the results shown. The declared keyboard layout (for example azerty/Fr) is used to convert keystrokes into the user's password. The characters of the password are mapped to position number according to the table. For example, the user types what they imagine is CARTHAGO on the real keyboard and if the real keyboard is qwerty/US layout, the client processes the string CQRTHQGO, since the declared keyboard is the French azerty keyboard layout.

The client then maps letters to number list for the password using the declared keyboard AZERTY: 79-55-30-31-60-55-59-35. The client then generates a word from this number list for each keyboard, which will result in the following strings: US: CARTHAGO Fr: CQRTHQGO Dv: JAPYDAIR. The client sends the n hashed passwords to the server which tests the client passwords against the expected one. If one of them match, then the login is ok otherwise login is denied. The mapping has corrected the keyboard difference for the password. The declared (Fr) keyboard produced a string that was not the actual password, but the additional passwords included the correct password from the table translation.

Figure 4:
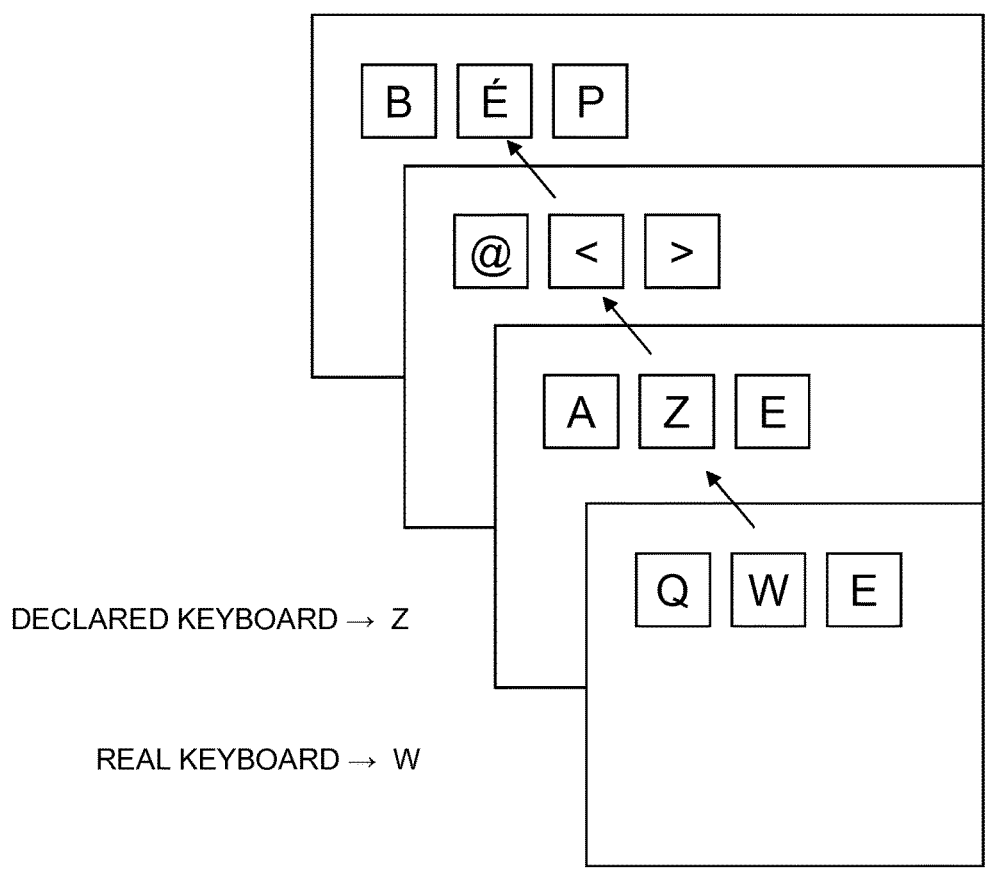
FIG. 4 is a schematic diagram showing mapping between different keyboard layouts.

FIG. 4 explains figuratively the process being used, which is essentially to imagine that all of the keyboard layouts are in a pile, with the real keyboard on top. Three keys are shown for four different keyboard layouts, to illustrate the principle. When the user presses the key W, on the real keyboard, the client understands the character Z of the declared keyboard. The authentication process simulates a key press on all keys of the specific column that contains a actual key pressed (in this case W, Z, < and É), and then generates a different string for each keyboard. The string coming from the real keyboard is the correct password, but this is not necessarily the same as the declared keyboard, which is the keyboard layout that the operating system is using.

The client does not know the real keyboard (the keyboard perceived by the user), but sends all generated strings to the server, including the correct one. The table of FIG. 3 shows all keys that are geographically at the same place on different keyboards, just as if the keyboards are all in a pile. The amended process is compatible with all authentication systems (using hash, "salt", multi-factor, etc.). The user can set preferences for a reduced set of keyboard (usually, their native layout and common ones) and the user can define their own keyboard layouts. Once new alternative keyboard layout definitions have been created they can be easily populated into the amended authentication system.

Essentially, FIG. 4 shows an alternative keyboard layout definition that comprises a three-dimensional matrix of different keyboard layouts mapping characters on each keyboard layout to characters on the other keyboard layouts.

The physical keyboard layouts are converted to logical tiles in a three dimensional matrix which allows a character string that is used as a password to be converted into multiple additional passwords, in order to remove any error caused by a keyboard layout mismatch. If the user makes a mistake in their belief as to the current keyboard layout or there is a mismatch between the operating system configuration and the actual keyboard configuration, then these will be captured by the amended authentication method.

Figure 5:
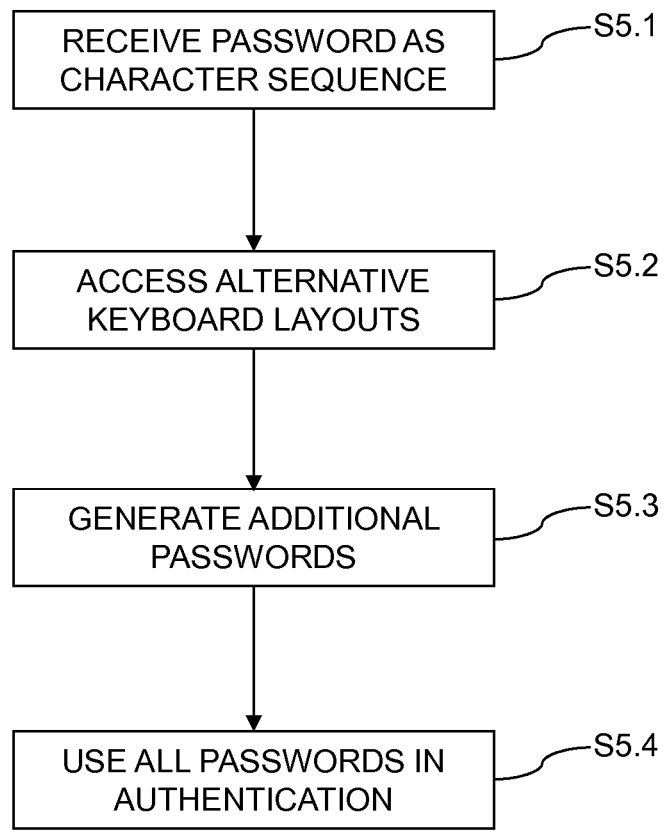
FIG. 5 is a flowchart of a method of performing user authentication.

The method of performing the user authentication is summarised in FIG. 5. The method comprises the steps of, firstly step S5.1, which comprises receiving a password comprising a sequence of characters. Here the user will enter their password on a real or virtual keyboard, based upon their understanding of the current keyboard layout. The second step in the method is step S5.2, which comprises accessing one or more alternative keyboard layout definitions. This step will be carried out at the client, which accesses local or remote storage to obtain the alternative keyboard layouts. As discussed above, these may comprise tables or matrices defining the relationship between keys in different layouts.

The third step of the method is step S5.3, which comprises generating one or more additional passwords from applying the alternative keyboard layout definitions to the sequence of characters. As described above the characters that make up the user's submitted password are converted into additional password using the alternative layouts. One additional password is created per alternative layout. The final step of the method is step S5.4, which comprises using the received password and the additional passwords in the user authentication process. Whatever authentication protocol is now used, with hashing for example, all of the different passwords will be handled in parallel, in order that any mismatches in keyboard layout are compensated.

It is therefore possible to provide a user authentication process that will not fail should the user have a mismatch between the keyboard that they think they are using when compared with the keyboard that they are actually using. If the user makes a mistake or the computer's software representation of the keyboard is different from the physical keyboard in front of the user, then this will be corrected for in the improved authentication method. Multiple different passwords are generated during the authentication protocol, one of which will match the keyboard layout that the user believes they are using, even if the there is a mistake about the correct keyboard layout.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of performing user authentication using a hardware processor, the method comprising:
   accessing two or more alternative keyboard layout definitions including an actual keyboard layout definition,
   prompting a user to enter a password comprising a sequence of characters, wherein a declared keyboard layout definition indicated at the user is distinct from the actual keyboard layout definition at the user,
   for each individual character of the sequence of characters entered using the actual keyboard layout definition in response to receiving input of the individual character, generating two or more additional characters by mapping the individual character to the two or more alternative keyboard layout definitions and selecting corresponding characters at the two or more alternative keyboard layout definitions,
   forming additional passwords in the two or more alternative keyboard layout definitions by replacing the sequence of characters of the password with the corresponding characters,
   sending the password and the additional passwords in a single packet to a server, and in response to receiving, from the server, an indication of a successful user authentication of one of the additional passwords, receiving access to a service, wherein forming the additional passwords resolves a situation where the declared keyboard layout definition is distinct from the actual keyboard layout definition.

2. A method according to claim 1, wherein an alternative keyboard layout definition comprises a three-dimensional matrix of different keyboard layouts mapping characters on each keyboard layout to characters on the other keyboard layouts.

3. A method according to claim 1, and further comprising executing a predefined hash function on each of the received password and the additional passwords to generate a plurality of hash values to be sent in the single packet to the server.

4. A method according to claim 1, and further comprising receiving a user input selecting the alternative keyboard layout definitions to be used in the authentication process.

5. A system for performing user authentication, the system comprising:
   a hardware processor arranged to:
   access two or more alternative keyboard layout definitions including an actual keyboard layout definition,
   prompt a user to enter a password comprising a sequence of characters, wherein a declared keyboard layout definition indicated at the user is distinct from the actual keyboard layout definition at the user,
   for each individual character of the sequence of characters entered using the actual keyboard layout definition, in response to receipt of input of the individual character, generate two or more additional characters by mapping the individual character to the two or more alternative keyboard layout definitions and selecting corresponding characters at the two alternative keyboard layout definitions,
   form additional passwords in the two or more alternative keyboard layout definitions by replacing the sequence of characters of the password with the corresponding characters,
   execute a predefined hash function on each of the password and the additional passwords to generate a plurality of hash values to be sent to a server, and
   send the plurality of hash values in a single packet to the server and in response to receiving, from the server, an indication of a successful user authentication of one of the additional passwords, receiving access to a service,
   wherein forming the additional passwords resolves a situation where the declared keyboard layout definition is distinct from the actual keyboard layout definition.

6. A system according to claim 5, wherein an alternative keyboard layout definition comprises a three-dimensional matrix of different keyboard layouts mapping characters on each keyboard layout to characters on the other keyboard layouts.

7. A system according to claim 5, wherein the hardware processor is further arranged to receive a user input selecting the alternative keyboard layout definitions to be used in the authentication process.

8. A computer program product on a computer readable medium for performing user authentication, the product comprising instructions for:
   accessing two or more alternative keyboard layout definitions including an actual keyboard layout definition,
   prompting a user to enter a password comprising a sequence of characters, wherein a declared keyboard layout definition indicated at the user is distinct from the actual keyboard layout definition at the user,
   for each individual character of the sequence of characters entered using the actual keyboard layout definition in response to receiving input of the individual character, generating two or more additional characters by mapping the individual character to the two or more alternative keyboard layout definitions and selecting corresponding characters at the alternative keyboard layout definitions,
   forming additional passwords in the two or more alternative keyboard layout definitions by replacing the sequence of characters of the password with the corresponding characters and
   sending the password and the additional passwords in a single packet to a server and in response to receiving, from the server, an indication of a successful user authentication of one of the additional passwords, receiving access to a service,
   wherein the computer program product resolves a situation where the declared keyboard layout definition is distinct from the actual keyboard layout definition.

9. A computer program product according to claim 8, wherein an alternative keyboard layout definition comprises a three-dimensional matrix of different keyboard layouts mapping characters on each keyboard layout to characters on the other keyboard layouts.

10. A computer program product according to claim 8, and further comprising instructions for executing a predefined hash function on each of the received password and the additional passwords to generate a plurality of hash values to be sent in the single packet to the server.

11. A computer program product according to claim 8, and further comprising instructions for receiving a user input selecting the alternative keyboard layout definitions to be used in the authentication process.

* * * * *